United States Patent [19]
Hunt et al.

[11] 3,874,857
[45] Apr. 1, 1975

[54] APPARATUS FOR FILTERING PARTICULATE MATTER FROM GAS AND HAVING REVERSE FLOW CLEANING MEANS

[75] Inventors: David H. Hunt, Simsbury; Raymond J. Allain, Hebron; Joseph E. Maselek, Rocky Hill, all of Conn.

[73] Assignee: The Spencer Turbine Company, West Hartford, Conn.

[22] Filed: Jan. 7, 1974

[21] Appl. No.: 431,149

[52] U.S. Cl. ............... 55/302, 55/379, 55/DIG. 26
[51] Int. Cl. ........................................... B01d 46/04
[58] Field of Search ............ 55/291, 293, 301, 302, 55/303, 341, 362, 365, 378, 379, 498, 499, 500, 501, DIG. 26; 210/411

[56] References Cited
UNITED STATES PATENTS

| | | | |
|---|---|---|---|
| 2,005,691 | 6/1935 | Hertz | 55/379 X |
| 2,769,506 | 11/1956 | Abboud | 55/379 X |
| 3,095,289 | 6/1963 | Egan | 55/378 X |
| 3,429,106 | 2/1969 | Abboud | 55/302 X |
| 3,498,030 | 3/1970 | Wilki | 55/302 |
| 3,499,268 | 3/1970 | Pausch | 55/302 |
| 3,509,698 | 5/1970 | Medcalf et al. | 55/302 |
| 3,680,285 | 8/1972 | Wellan | 55/341 X |
| 3,729,903 | 5/1973 | Espeel et al. | 55/341 X |

*Primary Examiner*—Frank W. Lutter
*Assistant Examiner*—David L. Lacey
*Attorney, Agent, or Firm*—McCormick, Paulding & Huber

[57] ABSTRACT

Apparatus for filtering dust particles from air comprises a plurality of flexible tubular-shaped gas permeable filter elements through which dust-laden air is constrained to pass in flowing through the apparatus. Each filter element has a clean-air outlet opening from which filtered air is withdrawn and a frustroconical diffuser disposed externally thereof in coaxial alignment with and axially spaced from the outlet opening. Means is provided to direct high velocity streams of air to and along the outer surface of the diffuser and in the direction of the outlet opening whereby the streams are evenly distributed over the surface of the diffuser and enter the filter element and flow therethrough in a controlled manner and in a direction counter to the direction of filtered air flow therefrom.

7 Claims, 6 Drawing Figures

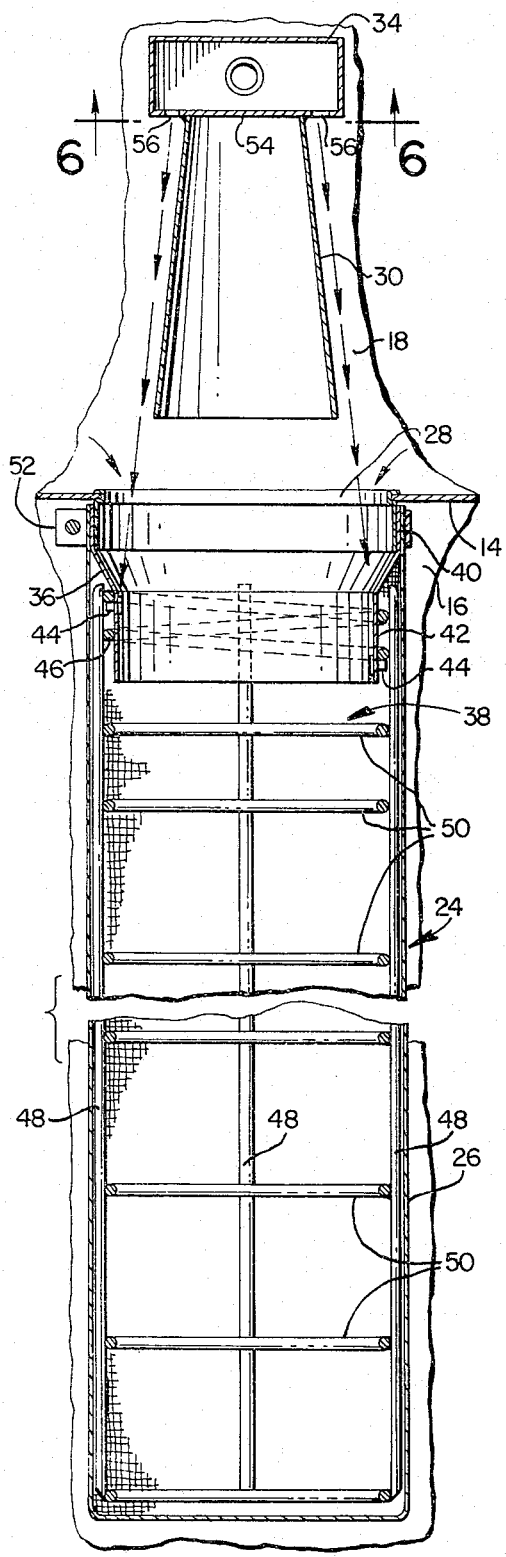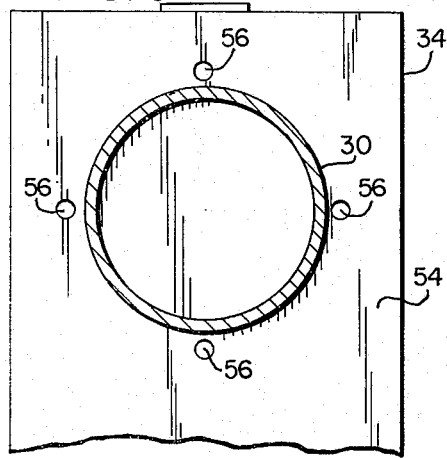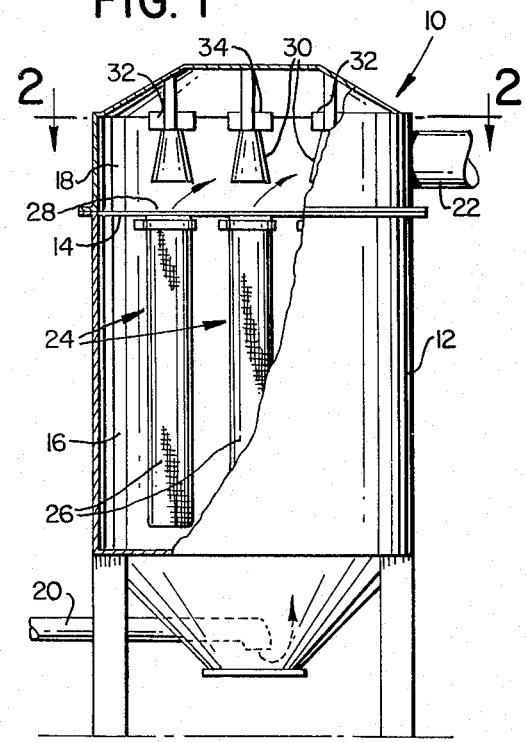

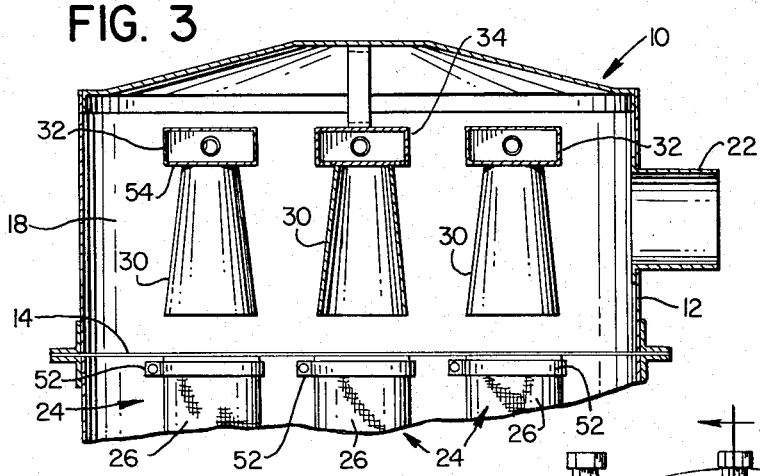
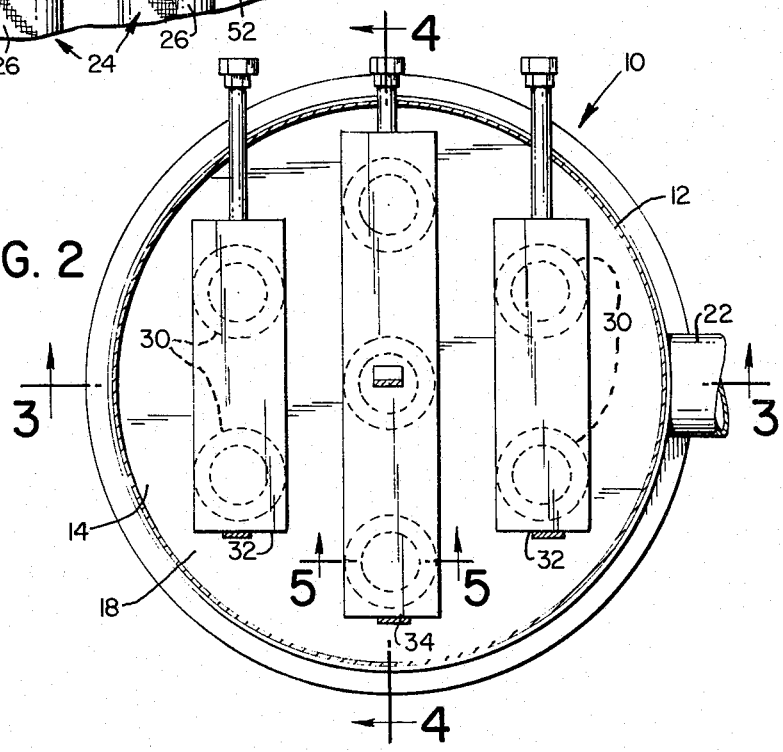
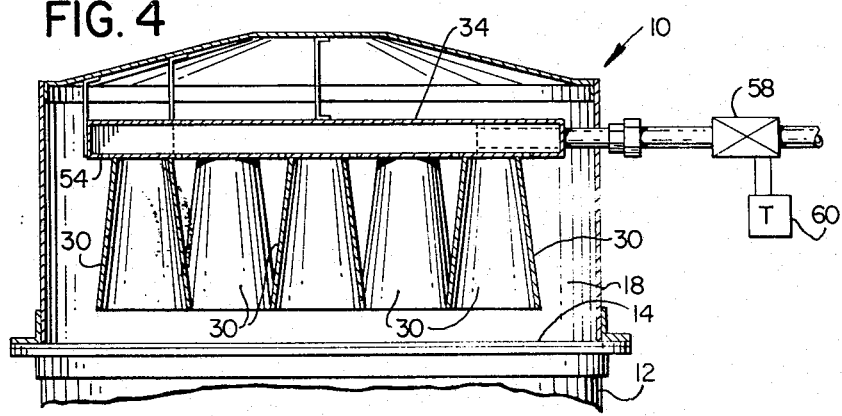

APPARATUS FOR FILTERING PARTICULATE MATTER FROM GAS AND HAVING REVERSE FLOW CLEANING MEANS

BACKGROUND OF THE INVENTION

This invention relates in general to filtering apparatus which includes at least one flexible tubular gas permeable filter element or fabric bag filter for separating particulate matter from gas and deals more particularly with improved apparatus of the aforedescribed general type which includes reverse flow means for periodically cleaning accumulated particulate matter from the filter element.

In such apparatus accumulation of particulate matter on surfaces of the filter elements and in the pores thereof restricts gas flow therethrough and substantially impairs apparatus efficiency. Heretofore, means have been provided to periodically reverse gas flow through the permeable filter elements to dislodge accumulated particulate matter from the surfaces and pores thereof, as for example, by dicharging a jet or high energy pulse of gas into each tubular filter element and in a direction counter to the direction of filtered air flow therefrom. However, it is generally recognized that the cleansing efficiency of the gas pulse is significantly affected by its configuration as it enters the filter element and travels along the inner surface thereof. Preferably the configuration of the reverse flow stream should be such that wave motion occurs along the entire length of the flexible filter material to vibrate or shake it whereby to dislarge accumulated particles therefrom. However, nodes tend to occur in the wave form particularly near the end portions of the tubular filter element thereby reducing the cleaning efficiency of the gas stream. Various venturi devices and diffusers have heretofore been provided for controlling the configuration of a reverse flow cleaning jet in such apparatus. Such a nozzle and diffuser arrangement is illustrated and described in U.S. Pat. No. 3,509,698 to Metcalf et al, issued May 5, 1970 for Filter Arrangement.

The present invention is concerned with provision of improved apparatus for providing controlled periodic reverse high velocity gas flow for efficiently cleaning a flexible gas permeable tubular filter element in an apparatus for filtering particulate matter from a gaseous stream. The general aim of the invention is to provide an improved gas filtering apparatus having highly efficient reverse flow cleaning means and of simple durable construction for low cost manufacture and efficient trouble-free operation.

SUMMARY OF THE INVENTION

In accordance with the present invention, improved apparatus is provided for filtering particulate matter from a gaseous stream and which comprises an axially elongated flexible tubular-shaped gas permeable filter element which has a clean-gas outlet opening at one end thereof. A substantially gas impervious frustroconical diffuser is supported externally of the filter element in generally coaxial alignment with the outlet opening and axially spaced therefrom. The diffuser diverges in the direction of the outlet opening and has a major diameter substantially smaller than the diameter of the outlet opening. Means is provided for directing a plurality of high velocity streams of gas toward the outer peripheral surface of the diffuser near its smaller end and in the direction of the outlet opening whereby the streams of gas are evenly distributed over the outer peripheral surface of the diffuser to travel generally along a path defined by said outer peripheral surface and into and through said outlet opening.

BRIEF DESCRIPTION OF THE DRAWINGS

FIG. 1 is a side elevational view of filtering apparatus embodying the present invention, a part of the housing shown broken away to reveal structure therein.

FIG. 2 is a somewhat enlarged sectional view taken generally along the line 2—2 of FIG. 1.

FIG. 3 is a fragmentary sectional view taken along the line 3—3 of FIG. 2.

FIG. 4 is a fragmentary side elevational view and shows the upper portion of the housing in section taken along the line 4—4 of FIG. 2.

FIG. 5 is a somewhat enlarged fragmentary sectional view taken along the line 5—5 of FIG. 2.

FIG. 6 is a somewhat further enlarged fragmentary sectional view taken along the line 6—6 of FIG. 5.

DETAILED DESCRIPTION OF THE PREFERRED EMBODIMENT

Referring now to the several views of the drawings and particularly to FIG. 1, an industrial air filtering apparatus embodying the present invention and indicated generally by the reference numeral 10 comprises a housing 12 having a partition 14 dividing the housing interior into a lower filtering chamber 16 and an upper clean-air chamber 18. Dust laden air enters the filtration chamber 16 through an inlet conduit 20. An outlet duct 22 communicates with the clean-air chamber 18 for connection to a suction fan or the like (not shown) to pull a vacuum on the filtering apparatus through the clean-air chamber 18. A plurality of gas permeable tubular filter units indicated generally 24, 24 and disposed within the filteration chamber 16 depend from the partition 14. Each filter unit 24 comprises a tubular filter element or bag filter 26 and an associated supporting structure, hereinafter further described, and has a clean-air outlet opening 28 at its upper end which communicates with the clean-air chamber 18.

In accordance with the present invention, each filter unit 24 has a frustroconical gas impervious diffuser 30 associated therewith and disposed within the clean-air chamber 18 in coaxial alignment with its outlet opening 28 and axially spaced therefrom. The diffuser diverges in the direction of the outlet opening 28 and has a major diameter substantially smaller than the diameter of the outlet opening. A plurality of generally rectangular manifolds 32, 32 and 34 mounted in the clean-air chamber 18 define plenum chambers and support the various diffusers 30, 30. The manifolds also provide means for directing a plurality of high velocity gas streams toward the outer peripheral surface of each diffuser, as will be hereinafter further discussed. Each manifold is supported in fixed position within the clean-air chamber 18 by brackets tack welded or otherwise suitably secured to the upper wall of the housing 12 and which depend therefrom, as best shown in FIG. 4. A supply pipe is connected to each manifold and extends through the side wall of the housing 12 for connection to a source of compressed air or the like.

Considering now the construction and arrangement of a typical filter unit and its associated diffuser and referring particularly to FIGS. 5 and 6, the illustrated filter unit 24 comprises a generally cylindrical support member 36 mounted in fixed position on the partition 14 and an elongated tubular skelatal support frame indicated generally at 38 and releasably connected to the support member 36 to depend therefrom. The bag filter 26 is releasably connected to the support member 36 and closely coaxially surrounds the skelatal support frame 38. The support member 36 defines the outlet opening 28 and includes a generally cylindrical upper end portion 40 which has an outside diameter substantially equal to the outside diameter of the skelatal support frame 38. The support member 36 further includes a generally cylindrical lower end portion 42 which has an outside diameter substantially equal to the inside diameter of the support frame 38. At least one stud 44 projects radially outwardly from the lower end portion 42, but preferably and as shown, two studs 44, 44 are provided which project from opposite sides of the lower portion 42. One of the studs 44 is located axially above the other stud substantially as shown in FIG. 5.

The skeletal support frame 36 includes a helical member or spirally wound rod 46 at its upper end which has an inside diameter substantially equal to the outside diameter of the end portion 42. A plurality of elongated rods 48, 48 welded or otherwise secured to the helical rod 46 extend in a generally axial direction to define the periphery of the tubular skeletal frame. A plurality of axially spaced annular rings 50, 50 welded or otherwise connected to the rods 48, 48 further comprise the skeletal frame 38 which is threadably connected to the support member 36 by engagement of the helical rod 46 with the studs 44, 44. The bag filter 26 is generally cylindrical, made from porous fabric, and releasably secured at its upper end to the support member upper end portion 40 by a suitable clamp such as indicated at 52 in FIG. 5.

The manifold 34 is preferably formed from sheet metal, has a generally rectangular cross section, and is partially defined by a lower wall 54 disposed in a generally radially direction relative to the filter unit 24. Preferably and as shown, the diffuser 30 comprises a thin sheet metal shell of frustroconical configuration welded or otherwise suitably secured at its smaller end to the lower wall 54. The manifold 34 supports the diffuser 30 in general coaxial alignment with the filter unit 24 externally thereof and in axially spaced relation thereto. A plurality of gas passageways or orifices 56, 56 open through the lower wall 54 in circumaxial relation to the diffuser 30. The latter orifices are preferably equiangularly spaced and arranged adjacent the smaller end of the diffuser, as best shown in FIG. 6.

Dust-laden air enters the housing 12 through the inlet conduit 20 and flows in the direction generally indicated by the arrows in FIG. 1. Heavy particles may be directed toward and are collected in a hopper at the lower end of the housing 12. However, lighter, airborne particles tend to accumulate on the outer surfaces of the bag filters 26, 26 as the air flows through the porous bags and upwardly therein to and through the outlet openings 28, 28 into the clean-air chamber 18, and to and through the exhaust duct 22. In accordance with the invention, the bag filters are periodically cleaned by introducing compressed air into the manifolds 32, 32 and 34 through the supply pipes associated therewith. This cleaning air may be supplied to the manifolds through valves, such as the valve 58 shown in FIG. 4. The latter valve may, for example, comprise an electrically controlled solenoid valve which operates in response to a suitable timing device such as the timer illustrated schematically at 60 in FIG. 4. Means (not shown) may also be provided for sequentially operating valves to release pressurized cleaning air so that the various bag filters 26, 26 may be sequentially cleaned.

Streams of cleaning air flow at relatively high velocity from the orifices 56, 56 associated with each diffuser 30 toward and along the outer peripheral surface of the diffuser. The latter air streams are uniformally distributed over the peripheral surface of the diffuser and flow into and through an associated inlet opening 28 in a controlled manner, as indicated by flow arrows in FIG. 5. This high velocity flow of cleaning air into the bag filter 26 tends to induce a secondary flow of clean air from the clean-air chamber 18 and counter to the direction of air flow induced in said chamber by the exhaust fan associated with the outlet duct 22. The introduction of high velocity cleaning air into each filter unit 24 in the aforedescribed controlled manner tends to cause desired vibratory movement of each bag filter 26 along its entire length whereby particulate material caked on the outer surface of the bag is cracked or otherwise dislodged therefrom. The reverse flow of air outwardly through and from the porous bag and into the filtering chamber 16 further serves to clean the pores of the bag fabric thereby increasing the filtering efficiency of the bag filter and prolonging its life.

We claim:

1. In an apparatus for filtering particulate matter from a gaseous stream, the combination comprising an axially elongated flexible tubular-shaped gas permeable filter element having a clean gas outlet opening at one end thereof, a substantially gas impervious frustroconical diffuser, means for supporting said diffuser externally of said filter element and in generally coaxial alignment with and axially spaced relation to said outlet opening, said diffuser diverging in the direction of said outlet opening and having a major diameter substantially smaller than the diameter of said outlet opening, and means comprising a plenum chamber having a generally radially disposed wall facing in the direction of and axially spaced from said one end and having a plurality of gas passageways opening therethrough for directing a plurality of streams of gas from said plenum chamber toward the outer peripheral surface of said diffuser near the smaller end thereof and in the direction of said outlet opening, whereby said gas streams travel generally along a path defined by said outer peripheral surface and into and through said outlet opening and into said filter element.

2. The combination as set forth in claim 1 wherein said means defining said plenum chamber comprises said means supporting said diffuser.

3. The combination as set forth in claim 2 wherein said diffuser is attached at its smaller end to said wall and said passageways are arranged circumaxially of said smaller end of said diffuser.

4. The combination as set forth in claim 3 wherein said passageways comprise equiangularly spaced orifices formed in said wall.

5. The combination as set forth in claim 4 wherein said orifices are substantially adjacent said smaller end.

6. The combination as set forth in claim 1 including a rigid generally cylindrical support member defining said outlet opening, an axially elongated tubular skeletal support frame, means for releasably connecting said support frame to said support member, said filter element comprising a bag filter made from porous fabric and closely coaxially surrounding said skeletal support frame, and means for releasably retaining said bag filter in connected relation to said support member.

7. The combination as set forth in claim 6 wherein said tubular skeletal frame has a helical rod generally defining one end thereof and a circumaxial series of elongated rods connected to said helical rod and extending in one axial direction therefrom to define the periphery of said tubular skeletal frame and said support member has one general cylindrical end portion which has an outside diameter substantially equal to the outside diameter of said tubular skeletal frame and another generally cylindrical end portion which has an outside diameter substantially equal to the inside diameter of said helical rod, said support member has at least one stud projecting generally radially outwardly from said other end portion for threadable engagement with said helical rod, said stud and said rod comprises said means for releasably connecting said skeletal support frame to said support member, and said means for releasably retaining said filter element on said support member comprises means for clamping said bag filter to said one cylindrical end portion.

* * * * *